United States Patent [19]

Korbell

[11] 4,210,857
[45] Jul. 1, 1980

[54] FIELD EXERTING AND REGULATOR CIRCUIT FOR A BRUSHLESS ALTERNATOR

[75] Inventor: George K. Korbell, Euclid, Ohio

[73] Assignee: Sheller-Globe Corporation, Cleveland, Ohio

[21] Appl. No.: 897,689

[22] Filed: Apr. 19, 1978

[51] Int. Cl.² .............................................. H02P 9/26
[52] U.S. Cl. ...................................... 322/28; 322/59; 322/72
[58] Field of Search ....................... 322/28, 59, 72, 73; 363/20

[56] References Cited

U.S. PATENT DOCUMENTS

| | | | |
|---|---|---|---|
| 3,374,418 | 3/1968 | Henderson et al. | 322/72 X |
| 3,526,823 | 9/1970 | Genuit | 363/20 |
| 3,617,857 | 11/1971 | Gunderson | 322/28 |
| 3,629,689 | 12/1971 | Rifk | 322/73 X |

Primary Examiner—Robert J. Hickey

[57] ABSTRACT

A field regulating circuit for a brushless alternator or the like in which a field winding is disposed on a rotor and energized from the secondary winding of a rotary transformer which has its primary winding connected to be energized from a circuit controlled by an oscillator and wherein the frequency of the oscillator is varied in response to a voltage sensing circuit providing a potential which varies with the output of the alternator, the output of the oscillator effecting the generation of first and second pulse trains with the trains being 180° out of phase and effecting energization of the primary of the rotary transformer by current pulses of a fixed width with the current pulses caused by the first and second pulse trains flowing in different directions through the primary winding of the brushless transformer, the pulse trains have pulses of fixed duration which is substantially equal to a half period of the oscillation for the frequency of the oscillator for supplying full field current.

6 Claims, 3 Drawing Figures

FIELD EXERTING AND REGULATOR CIRCUIT FOR A BRUSHLESS ALTERNATOR

BACKGROUND OF THE INVENTION

The present invention relates to a regulating and energizing circuit for the field coil of a brushless alternator in which the primary of a rotary transformer is supplied with direct current pulses to effect energization of the field coil with the pulses being modulated to control the field current in response to the output voltage of the alternator.

The art discloses oscillators to provide pulses to effect energization of the field coils in generators and alternators. U.S. Pat. No. 3,374,419 energizes the field coil of a rotating generator with uni-directional pulsating current at a high frequency current. Similarly, U.S. Pat. No. 3,631,258 discloses circuitry for pulsating the field coil at a rate approximately 10 times gerater than the off/on frequencies of the regulator, for example, 1,000 Hz.

In addition, the art has recognized the use of a pulse generator to supply current pulses to a center tapped transformer whose secondary windings operate to supply DC current to a load, see U.S. Pat. No. 3,526,823, and the use of DC current pulses derived from an oscillator which are applied to the center tapped primary of a rotary transformer in a brushless alternator, see U.S. Pat. No. 3,617,857. The pulses are at a frequency greater than the on/off regulation of the regulator in response to the output voltage of the generating machine. Regulation is accomplished by providing constant frequency pulses from an oscillator and turning the oscillator fully on and fully off in accordance with the during machine output voltage. In the circuit of U.S. Pat. No. 3,526,823 current pulses of uniform width are supplied at a variable frequency to energize the center tapped primary of a transformer with direct current pulses that flow in opposite direction in the primary to induce current in the transformer secondary for supplying DC current to a load. U.S. Pat. No. 3,378,708, utilizes a static type multivibrator circuit as a free running oxcillator to the supply energizing pulses to an alternator coil with the oscillator frequency and pulse width being varied in dependency on alternator output voltage.

SUMMARY OF THE INVENTION

The present invention is an improvement in an exciting and regulating circuit for energizing the primary coil of a rotary transformer of a brushless alternator to vary the field current of the field coil mounted on the rotor of the alternator, the field current being recitifed by AC current from the secondary of the rotary transformer.

In accordance with the present invention, the primary of the rotary transformer is energized by constant duration pulses with the period between pulses being modulated. More specifically, two pulse trains having the same frequency and preferably the same pulse duration but 180° out of phase trains are generated to effect energization of the transformer primary for the duration of each pulse with current from one of the pulse trains flowing in one direction in the primary and that from the other flowing in the opposite direction. To vary the excitation of the alternator the pulse trains are modulated by varying the period between pulses (i.e., the off-time of the pulse generator) in dependency on the alternator output voltage while maintaining the pulse width constant. Thus, the transformer primary is energized by constant width pulses having a frequency dependent on load. The time duration of the pulses is set to effect efficient energy transfer in the transformer with a minimum of saturation in the magnetic circuit of the transformer.

In the preferred form of the invention, two square waves at 180° out of phase are generated by a voltage to frequency converter, i.e. a voltage controlled oscillator in the form of a symmetrical free running multivibrator, with the frequency of the square wave being varied in response to a voltage which varies in accordance with the load of the alternator. The positive going edge of each square wave is utilized to trigger a respective univibrator for producing a pulse of predetermined width to provide a pulse train having the pulses of constant width and a pulse frequency which varies with the frequency of the square wave. The pulse trains from the univibrator are 180° out of phase and effect energization of the primary of the rotary transformer for the duration of each pulse, the currents from the different trains flowing in opposite directions in the primary.

In a specific aspect of the invention, the operation of the square wave generator is such to assure that if the frequency of the square wave becomes such that the half cycle of the square wave is less than the pulse duration of a univibrator pulse, each univibrator will be cut off when the other is triggered to avoid overlapping pulse periods for the univibrators.

In another aspect of the present invention, a switching circuit is switched off and on as the regulated voltage rises and falls between the limits of regulation to change the potential to an integrating circuit between low and high levels, the integrating circuit providing a control voltage for controlling the frequency of a voltage to frequency converter for modulating pulses for energizing the primary of a rotary transformer of a brushless alternator.

In accordance with another aspect of the present invention, a voltage for controlling the frequency of operation of the oscillator is supplied through circuitry energized directly from the AC stator winding of the alternator so that the stator must be producing an output voltage before the circuitry is capable of energizing the field coil. This is particularly advantageous in systems such as automotive vehicles where it is desired to supply field current upon the starting of the alternator but to render the field circuit inoperative when the alternator is not operating. In this area, it has been known to render a field exciting and regulating circuit effective by a voltage derived from rotation of the alternator.

DESCRIPTION OF THE DRAWINGS

The invention and the objects thereof are described in more detail in the following description made with reference to the accompanying drawings, forming a part of the present invention for all subject matter disclosed therein, wherein:

Referring to FIG. 1, an alternator A has its output rectified by a load rectifier 9. A voltage sensing circuit 10 senses the output voltage on the output side of the rectifer. A battery 11 is connected across the output of the load rectifier. The output from the sensing circuit which is switched off and on as the output rises and falls to regulating limits is integrated to provide a control voltage for a voltage to frequency converter 12 for producing two symmetrical square waves having a frequency dependent upon the voltage applied thereto. In the preferred and illustrated embodiment the converter 12 is a symmetrical multivibrator which produces square waves of high and low levels each for a half cycle. The two square waves are 180° out of phase and the square waves are applied by connections 13 and 14 to respective univibrators 15 and 16 with the positive going edges of the square waves triggering the respective univibrators to an astable position to produce an output pulse of a predetermined width.

Figure 1:
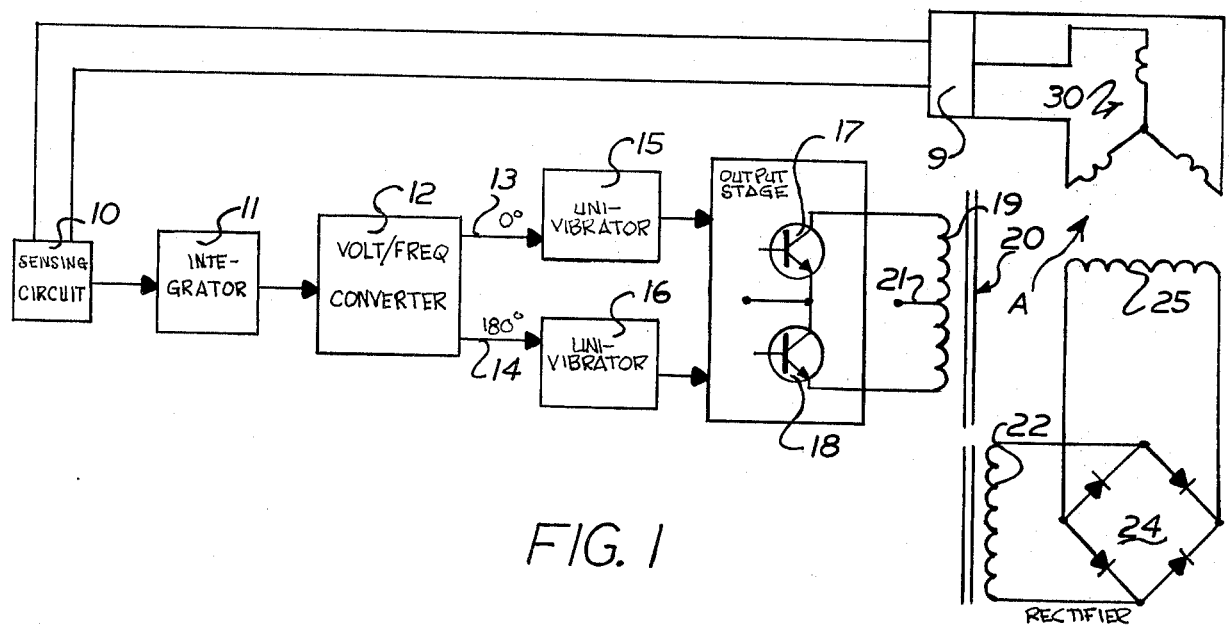
FIG. 1 is a schematic block diagram of a regulating and energizing circuit for the field coil of a brushless alternator in accordance with the present invention.

The pulses from the univibrators 15 and 16 render conductive respective transistors 17, 18 for the duration of each applied pulse. The transistors are respectively connected to the opposite ends of a center tapped fixed primary 19 of a rotary transformer 20. The transistors will be rendered alternately conductive by the pulses from the univibrators 15 and 16 to energize respective sections of the primary 19 with pulses which flow in opposite directions through the primary to the center tap 21.

The rotary transformer 20 has as a secondary coil 22 which is energized by the transformer action from the simulated AC current in the primary 19 of the rotary transformer 20. The current in the secondary coil 22 is rectified by a full wave rectifier 24 to energize the field coil 25 of the alternator. The field coil 25 is on the rotor of the alternator and the field coil 25 and the secondary winding 22 rotate with the rotor part of the alternator.

As the output voltage of the alternator varies, the sensing circuit 10 and the integrator 11 will cause a varying voltage to be applied to the voltage to frequency converter 12. This varies the frequency of the square waves being generated to vary the number of pulses per unit time for triggering the univibrators 15 and 16 to vary the off time intervals of the transistors 17 and 18 and the energization of the primary 19 as a function of the output voltage of the alternator. It will be apparent that when the frequency of the pulse trains has a half period which is the same as the duration of the pulses from the univibrators when maximum field current has been reached.

Figure 2:
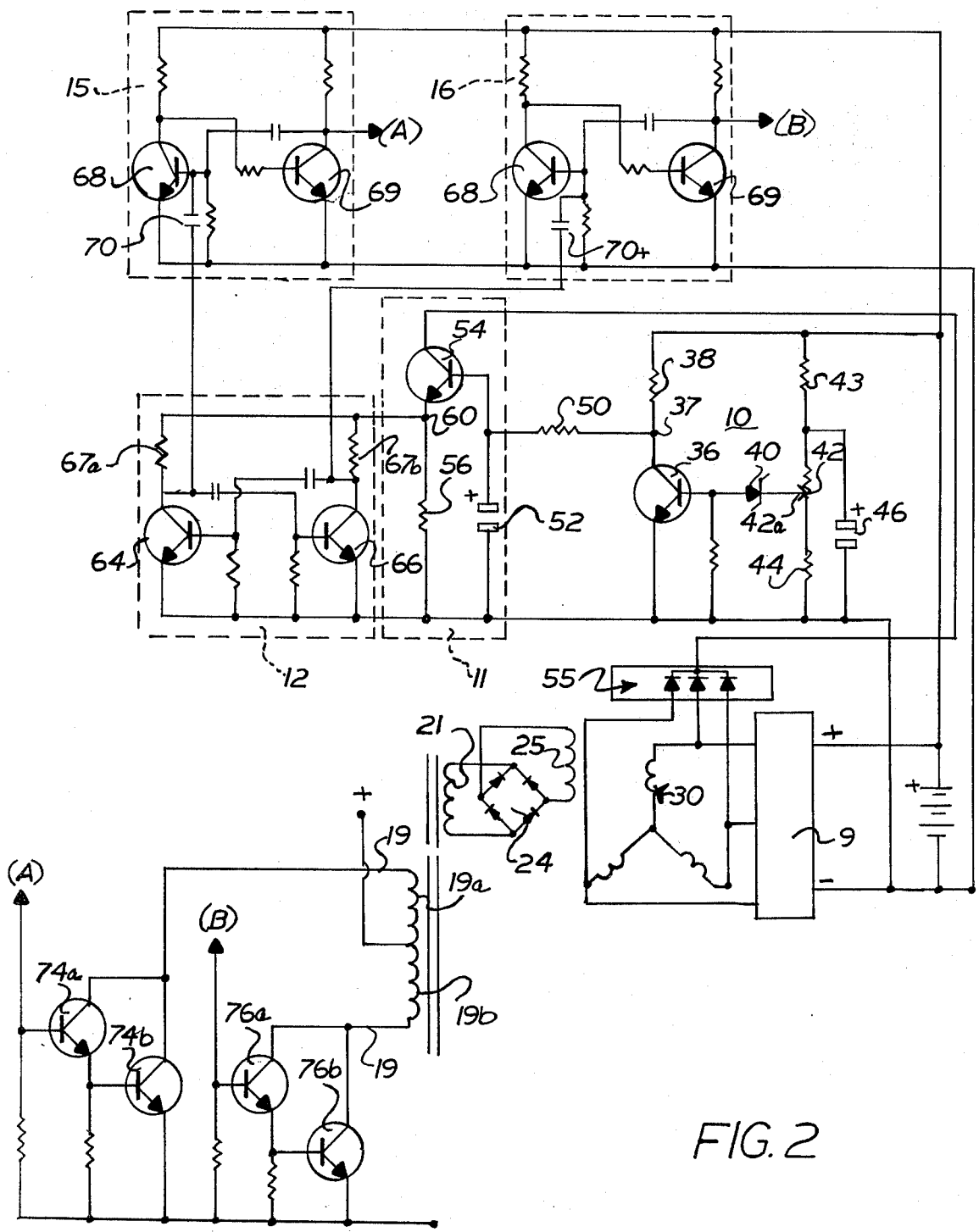
FIG. 2 is a more detailed circuit diagram of the preferred embodiment of an electrical regulating and energizing circuit embodying the present invention.

Referring to FIG. 2, the schematic circuit of FIG. 1 is shown in more detail. The sensing circuit 10 is connected across the output of the load rectifier 9 which is a full wave rectifier connected to rectify the AC output of the stator windings 30 of the alternator A. The sensing circuit comprises a transistor 36 which is switched on and off as the voltage rises and falls between the high and low regulating levels. The transistor has its collector-emitter circuit connected in series with a load resistor 38 across the output of the load rectifier and across the battery. The base of the transistor 36 is connected through a zenor diode 40 to the tap 42a of an adjustable resistor 42 which is connected in series with resistors 43, 44 across the load rectifier to form a voltage dividing network. A condenser 46 is connected in parallel across the resistors 42 and 44. In operation, the zenor diode will break down as the output voltage rises to the high level of regultion to render the transistor 36 conductive and will extinguish itself as the voltage at tap 42 falls to the lower level of regulation.

The collector of the transistor 36 is connected to the integrating circuit 11. A resistor 50 and a condenser 52 of the integrating circuit are connected across the collector-emitter electrodes of the transistor 36 so that the transistor controls the charging voltage applied to the condenser. When the transistor 36 is non-conductive, the collector voltage of transistor 36 is at a high level to provide a charging potential to the condenser through the resistor 50. When the output voltage across the sensing circuit reachs a level to cause the zenor diode 40 to break down and transistor 36 to conduct, the voltage of the collector of transistor 36 becomes low and only a small charging potential is applied to the transistor.

The resistor 50 and condenser 52 are also connected to the base of a transistor 54 having its collector connected to the output of a diode trio 55, the anodes of the diodes being connected to the stator windings to provide potential to the collector of the transistor 54 when the alternator is operated. The emitter of the transistor 54 is connected to ground through a resistor 56. When the alternator is operating to apply a potential to the collector of transistor 54, base current from the transistor 36 of the sensing circuit and the condenser 52 will render the transducer 54 conductive to develop a control voltage for the voltage to frequency converter 12.

It will be observed that the transistors 36 and 54 form a discharge circuit for the condenser 52 when either is conductive and that the condenser will effectively perform an integrating function to provide a base potential to transistor 54 which depends on the switching action of transistor 36 and is a function of the alternator load.

The frequency converter or multivibrator 12 is a conventional free running symmetrical multivibrator having cross-coupled transistors 64, 66. A junction 60 between the transistor 54 and resistor 56 of the integrating circuit is connected to the collectors of the transistors 64, 66 through load resistors 67a, 67b. The operating potential at junction 60 for the multivibrator 12 varies in dependency on the base current of transistor 54 which in turn is a function of the load on the alternator.

The operation of multivibrator circuit 12 produces identical square wave voltages at the collectors of transistors 64, 66 but with the waveforms 180° out of phase. The waveforms are shown in FIGS. a and b of FIG. 3 for no load conditions.

The collectors of transistors 64, 66 of the multivibrator 12 are connected to trigger respective one of the univibrators 15, 16 on the occurrence of the positive going edge of the respective square wave at the collector. As shown in FIG. 2, the univibrators are conventional and each comprise transistors 68, 69 each transistor having its collector connected to the base of the other transistor with the base of transistor 68 being capacitively coupled and the base of transistor 69 being resistively coupled to the collector of the other tranistor to provide stable and astable states. The univibrators are triggered from their stable state by the positive going edge of the respective square wave from the multivibrator 12 capacitively coupled through respective condensers 70 from the collectors of the transistors 64, 66 to the base of the transistor 68 of the corresponding one of the respective univibrators 15, 16. When the collector of transistor 64 goes positive the leading edge of the square wave will pull the base of the corresponding univibrator transistor 68 sharply positive and triggers the univibrator to its astable state for a period which is controlled by the RC constants of the univibrator.

Similarly, the collector of transistor 66 is capacitively coupled to the transistor 68 in the univibrator 15 through a capacitor 70 to trigger the univibrator 16 when the transistor 66 is switched off during the free running operation of the multivibrator circuit.

The output pulses in the pulses in the pulse trains from the univibrators 15, 16 are square pulses and the pulse trains are 180° out of phase. The pulses from the univibrator 15 are applied to the base of a transistor 74a connected in a Darlington configuration with the base of a transistor 74b while the pulses from the univibrator 16 are applied to the base of a transistor 76a connected in a Darlington configuration with a transistor 76b.

The collectors of the transistors 74a, 74b are connected to one end of the primary 19 of the rotary transformer 20 while the collectors 76a, 76b are connected to the other end of the primary 19. The primary 19 has a center tap which is connected to the positive side of the power supply so that when the Darlington pair 74a, 74b is turned on by a pulse from the univibrator 15, current flows from the positive side of the power supply through the center tap and the primary section 19a of the rotary transformer 20 through the Darlington transistors 74a, 74b to ground. With this current flow, the secondary of transformer sees the current as flowing in one direction through the primary coil. When the Darling transistors 76a, 76b are turned on by a pulse from the univibrator 16, current flows from the positive side of the load rectifier (or battery) to the center tap and through primary coil section 19b and the Darlington transistors 76a, 76b to ground. This current flows through the primary in a direction opposite to the direction of the current flow when the transistors 74a, 74b are on.

As a result of the foregoing, the secondary 21 of the transformer will through transformer action have pulses of opposite polarity which are full wave rectified to energize the field coil of the alternator.

The frequency of the pulses will vary with the load of the alternator. As the alternator starts, the voltage from the diode trio 55 will supply the collector voltage for the transistor 54 and this transistor will then conduct as a function the integrated voltage across condenser 52 and the voltage at junction 60 will control the frequency of the multivibrator 12. On starting, the condenser 52 will be charged from the battery and as the rotor starts rotating it will supply a potential to collector of transistor 54 to start the operation of the multivibrator and supply field current to quickly build up the alternator output voltage. During this period, the transistor 36 is nonconductive. When the voltage at the output side of the voltage rectifier approaches the maximum level at which it is to be regulated, zenor diode 40 will break down to render the transistor 36 conductive until the output drops to the lower level of regulation and switches the zenor diode off. This is a conventional mode of operation of a switching type transistor regulator.

The voltage periods for the on and off conditions of the transistor 36 are integrated by the condenser 52 to establish the control voltage at the collector of transistor 54 for determining the frequency of the multivibrator 12. At low loads, the output transistor 36 of the sensing circuit will have longer on periods and the charge on condenser 52 will be relatively low producing a low frequency of operation of the multivibrator.

Figure 3:
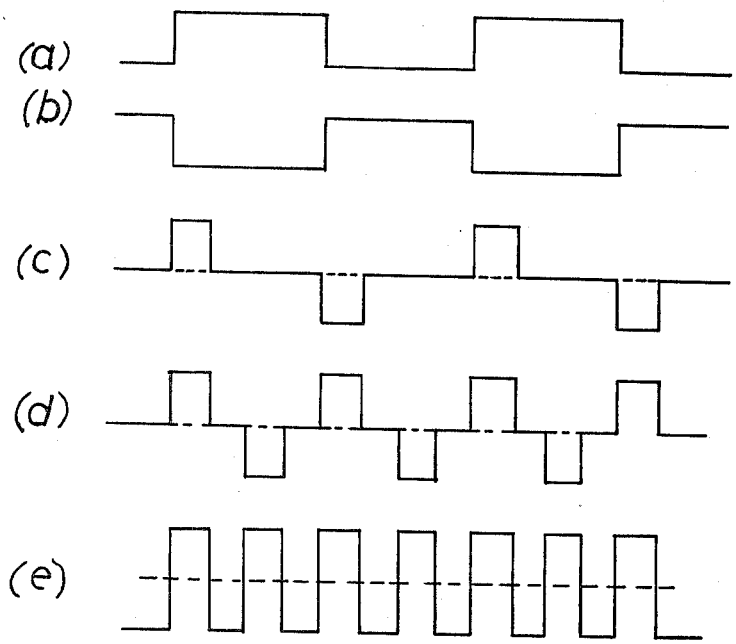
FIG. 3 is a chart illustrating electrical waveforms.

In FIG. 3, waveforms (a) and (b) illustrate the voltage waveform at the collectors of transistors 64, 66 for low frequency operation at low loads. Waveform (c) illustrates the current pulses in the rotary transformer primary at low loads. As the load increases, the periods of conductivity of transistor 36 will be shorter and the potential at junction 37 will be high for longer integrated periods of time and the voltage across the condenser 52 will be higher to increase the frequency of operation of the multivibrator to increase the number of pulses to the rotary transformer. In FIG. 3, waveform (d) illustratres the pulses in the primary of transformer 20 with increased load. Full load regulation is reached when the duration of the pulses from the univibrator are the half cycle period of the square waves generated by the multivibrator 12 at which time the pulses to the primary sections will effectively be a continuous AC square wave as shown by waveform (e) of FIG. 3.

It will be noted that if the frequency of the square waves from multivibrator is such that the half-cycle period is shorter than the pulse duration from the univibrators, as determined by the RC constants of the univibrator circuits, the square wave will force the univibrator which is in its astable state to its stable state to terminate the output pulse when the multivibrator 12 changes states to trigger the other univibrator to its astable state.

For example, if the univibrator 15 is in its astable state with transistor 68 conducting, multivibrator 12 will be in its state where transistor 69 is non-conductive. If the multivibrator 12 changes state to render transistor 64 conductive before the univibrator returns to its stable state with transistor 69 conducting and its collector at a low level, the change in voltage at the collector of transistor 64 will pull the base of transistor 68 sharply in a negative direction to turn off the transistor and render transistor 69 conductive to set the univibrator in its stable state. Thus both pairs of the Darlington connected transistors cannot be conductive at the same time to supply current to the primary 19.

While the preferred embodiment of the present invention shows the square waves of the voltage to frequency converter 12 have a high level of a half cycle and a low level for the second half cycle, it will be understood that the present invention includes aspects which are applicable to square waves and in turn to system where the triggering pulses to the univibrators may be somewhat different from 180° out of phase.

The pulse duration from the univibrators has been described as such to effect efficient energy transfer in the rotary transformer. The pulse duration may be varied depending in part on the power required and any other factor that would effect efficiency of power transferred. By way of example, only a pulse width of ¼ millisecond has been used in automatic systems.

What is claimed is:

1. A field exciting and regulating system for an electrodynamic machine for generating electricity with the machine having a rotor, a field winding on the rotor, and a rotary transformer having a secondary winding rotatable with the rotor with the secondary winding being connected to energize the field winding and a primary winding having first and second winding sections for conducting currents in opposite directions in the primary winding, said system comprising circuit means for regulating the output voltage level of the machine comprising a first circuit for providing a potential which varies as a function of the output voltage of the machine, a voltage controlled oscillator connected to said first circuit for providing a first and second series of triggering signals both having a frequency which varies with said potential of said first circuit with the first and second triggering signals being approximately 180° out of phase, second circuit means for producing first and second pulse trains for effecting energization of said first and second primary sections alternately with a current pulse of a fixed width comprising pulse generating circuitry responsive to said first series and second series of triggering signals to respectively provide said first and second pulse trains wherein each pulse is of fixed duration and has a duration substantially equal to the half period for the frequency of said oscillator when full field current is supplied.

2. A field exciting and regulating system as defined in claim 1 wherein said oscillator is a free running multivibrator for producing said first and second series of triggering signals and said second circuit means comprises first and second univibrators respectively operable in response to said first and second series of triggering signals and each having stable state and triggered to an astable state by a triggering signal to produce a fixed duration pulse of said pulse trains.

3. A field exciting and regulating system as defined in claim 1 wherein said oscillator generates a first and second electrical waveform 180° out of phase, each waveform being a square wave having a high level for approximately ½ of a cycle and a low level for approximately the other half of a cycle and said triggering signals are derived from the change in level in one direction of said square waves.

4. A field exciting and regulating system as defined in claim 2 wherein said circuit for providing a potential varies as a function of the output voltage comprises an integrating circuit for providing said potential and a switching circuit connected to sense the voltage output of said machine and to switch between one state as the voltage rises to a high limit of regulation and a second state as it falls to a low limit of regulation to switch a charging potential to said integrating circuit between low and high levels.

5. A field exciting and regulating system as defined in claim 3 wherein said oscillator comprises first and second alternately conductive transistors for deriving said first and second square waveforms respectively, the change in conductive state of one of said transistors forcing the change of the conductive state of the other of said transistors and means connecting said first and second univibrators to said first and second transistors whereby a univibrator in its astable state is forced to its stable state upon a change in conductive conditions of said first and second transistors.

6. A field exciting and regulating circuit for variably energizing the field of an alternator to control the output voltage by modulation of pulses, voltage sensing means having a circuit switched between conductive and non-conductive states as the output voltage rises and falls to upper and lower levels of regulation, an integrating circuit, means for applying a potential to be integrated to said integrating circuit, and for switching said potential between high and low levels as said circuit switches between its states, means responsive to the integrated potential of said integrating circuit for means for producing current pulses as a function of said integrated potential for effecting energization of said field comprising a frequency to voltage converter and a fixed width pulse generating circuit connected thereto.

* * * * *